(12) United States Patent
Strauch

(10) Patent No.: US 6,386,638 B1
(45) Date of Patent: May 14, 2002

(54) SEAT BACK FOR A VEHICLE

(75) Inventor: Joachim Strauch, Steyr (AT)

(73) Assignee: TCG Unitech Aktiengesellschaft, Kirchdorf/Krems (AT)

( * ) Notice: Subject to any disclaimer, the term of this patent is extended or adjusted under 35 U.S.C. 154(b) by 0 days.

(21) Appl. No.: 09/580,921

(22) Filed: May 26, 2000

(30) Foreign Application Priority Data

May 27, 1999 (AT) ............................................. 371/99 U

(51) Int. Cl.$^7$ ................................................. B60N 2/64
(52) U.S. Cl. ............................ 297/452.18; 297/452.31
(58) Field of Search ......................... 297/452.18, 452.2, 297/452.31

(56) References Cited

U.S. PATENT DOCUMENTS

| | | | | |
|---|---|---|---|---|
| 5,108,151 A | * | 4/1992 | Peters et al. | 297/452.18 |
| 5,447,360 A | * | 9/1995 | Hewko et al. | 297/452.18 |
| 5,685,612 A | * | 11/1997 | Macdonald et al. | 297/378.1 |
| 5,716,100 A | * | 2/1998 | Lang | 297/452.2 |
| 5,895,096 A | | 4/1999 | Massara | |
| 5,951,110 A | * | 9/1999 | Conner et al. | 297/452.31 |

FOREIGN PATENT DOCUMENTS

| | | |
|---|---|---|
| DE | 3337910 | 5/1985 |
| DE | 4109179 | 9/1991 |
| DE | 19630288 | 1/1997 |
| DE | 19833887 | 3/1999 |
| EP | 0244785 | 11/1987 |
| EP | 0646493 | 4/1995 |
| EP | 0881116 | 12/1998 |
| GB | 2246699 | 2/1992 |

\* cited by examiner

*Primary Examiner*—Peter R. Brown
(74) *Attorney, Agent, or Firm*—Dykema Gossett PLLC

(57) ABSTRACT

The invention relates to a seat back for a vehicle with a one-piece supporting structure made of light metal alloy, with a frame having an essentially rectangular contour and defining the upper, the lower and the two lateral delimitations of the seat back. A particularly stable embodiment is achieved by having a cross-shaped reinforcement rib accommodated in the frame in the vicinity of its diagonals, said rib being provided with rib structures arranged thereon in a grid-like configuration.

5 Claims, 5 Drawing Sheets

SEAT BACK FOR A VEHICLE

BACKGROUND OF THE INVENTION

The present invention relates to a seat back for a vehicle with a one-piece supporting structure made of light metal alloy, with a frame having an essentially rectangular contour and defining the upper, the lower and the two lateral delimitations of the seat back.

Increasingly great demands are made upon seat backs for vehicles. On one side, a seat back must offer high structural integrity. This is particularly important when an anchor point for a seat belt is provided on the seat back, as this is desirable with cabriolets and minivans. Great stability under load is also required to improve crash safety. On the other hand however, high standards are required from a seat back as well as from other vehicle parts with regard to lightweight construction. Therefor, the supporting structure for such a seat back is increasingly often made of light metal. The alloys that are particularly in use are aluminum and magnesium alloys. It is particularly advantageous to make the supporting structure in one piece and to form it by pressure die-casting.

DESCRIPTION OF THE PRIOR ART

DE 196 30 288 A and DE 198 33 887 A present a supporting structure for a seat back consisting of a bordering frame surrounding a large central opening. Although such a frame offers some structural integrity, a big quantity of material is required to achieve enough rigidity in order to fasten the belt, which increases not only the weight but also the costs.

EP 881 116 A discloses a seat frame consisting of a plate bordered by a flange. One large central opening and several smaller openings are provided therein. Compared to the weight required, integrity as well as rigidity are unsatisfactory.

EP 0 244 785 A presents a back for vehicle seats, in particular for the rear seats of vehicles, that is provided with a cross-shaped sheet metal part. Here too, structural integrity is not sufficient.

The solutions disclosed in EP 0 646 493 A or in GB 2 246 699 cannot meet the requirements either.

SUMMARY OF THE INVENTION

The object of the invention is to provide the possibility to improve a vehicle seat of the type mentioned above in such a way that it weighs less while gaining in rigidity and in stability under load. Another object is to render production of the supporting structure as easy and inexpensive as possible.

The solution of these objects is to accommodate in the frame, in the vicinity of its diagonals, a cross-shaped reinforcement rib that is provided with rib structures arranged thereon in a grid-like configuration. Thanks to the solution according to the invention, two advantageous effects are obtained at the same time. One of them is that the cross-shaped reinforcement rib proved to be a very effective stiffener in particular for seat backs provided with an anchor point for a seat belt. The other is that the flow paths of the material can thus be shortened during the manufacturing process, which has a positive influence on quality and integrity. Still another advantage is that the reinforcement rib offers protection of the occupants from objects penetrating the vehicle from behind.

From a casting point of view, it is advantageous when the reinforcement rib is slightly curved. In order to prevent thermal tensions during the cooling process, which may cause undesired deformations or cracks, a slight curvature proved to be advantageous. Such a curvature can either be designed as an overall curvature, the reinforcement rib following the shape of a cylindric or of a spheric surface tentered within the frame or as a local curvature, in which the individual webs of the reinforcement rib have a curved section. The advantage of the overall curvature is that temperature stress can be reduced without a problem, whereas the local curvature is characterized by a specific rigidity.

A shape that is particularly suited for casting is obtained by providing the reinforcing rib with a central part from which one connecting web is projecting to either corner of the frame. In a particularly preferred embodiment, at least one connecting web is divided into two sections by a recess. As a result, the flow paths can be optimized, since the flow velocity is increased by reducing the cross section so that cooling of the melted mass during the casting process is reduced, which also brings about best integrity.

In a particularly preferred embodiment of the invention, the gating is accommodated in a recess constituted by the reinforcement rib and the frame. As a result, the overall dimensions of the casting mold can be kept small. It also proves particularly advantageous that the flow paths to the corners of the frame, which are particularly subject to load, are short and of about the same length. This can be particularly fostered by the fact that the gating preferably occurs in the central part of the reinforcement rib. The gate, that is the transition area between the gating and the work piece, has got the shape of a fan. On completion of the casting procedure, the gate is punched off. Another advantage of this solution is that a lordosis support can be accommodated in the finished seat in the relatively large recess provided for the gating.

The quality of casting can be improved further by arranging connecting ribs serving as flow aids on the transitions between the frame and the reinforcement rib.

BRIEF DESCRIPTION OF THE DRAWINGS

The invention is explained more thoroughly in the following description of the embodiments illustrated in the drawings.

DETAILED DESCRIPTION OF THE PREFERRED EMBODIMENTS

Figure 1:
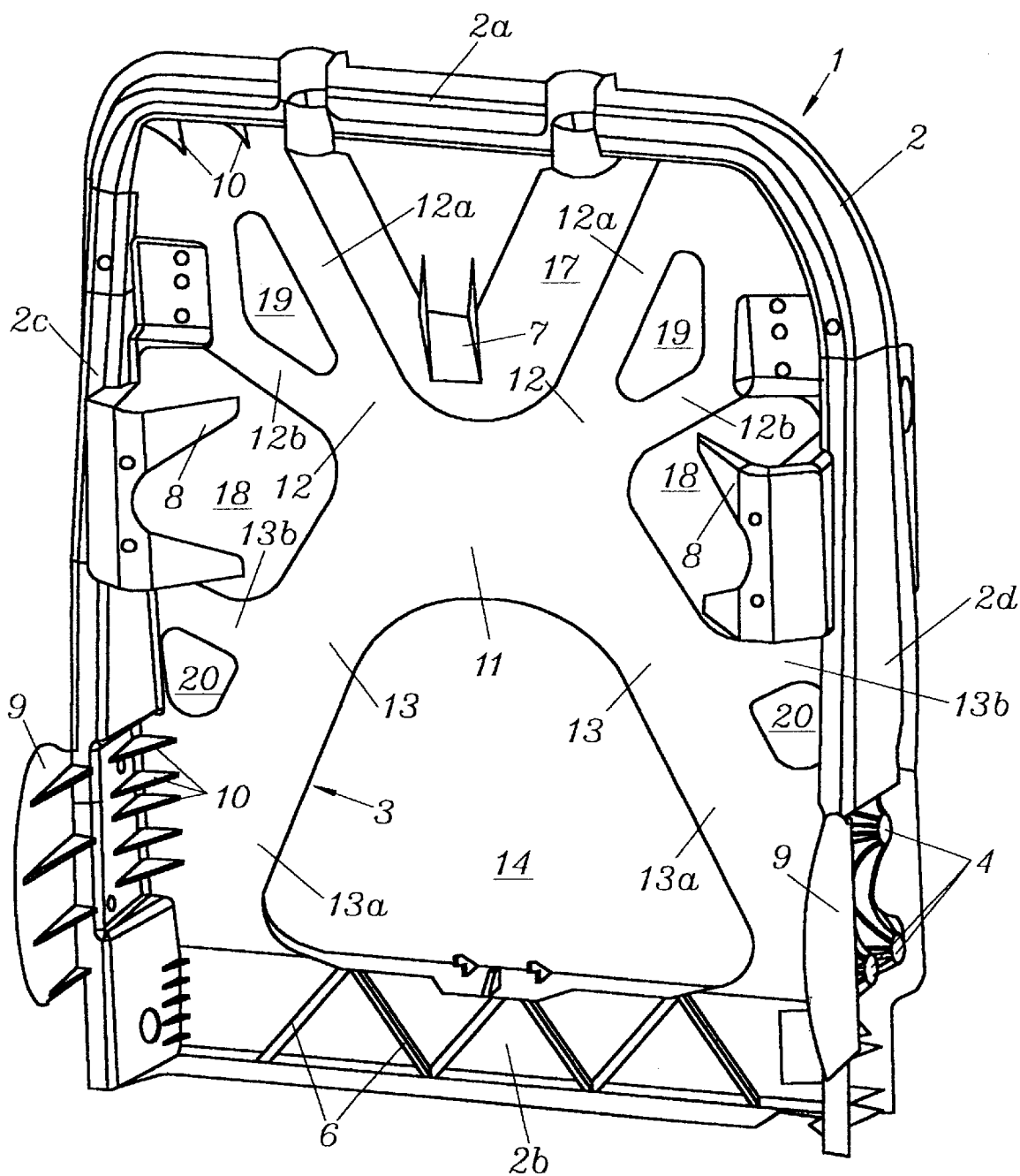
FIG. 1 is an axonometric front view of a seat back according to the invention.

For the sake of simplification, the FIGS. 1 through 4 only show the supporting structure 1 of the seat back. The supporting structure 1 consists of a bordering frame 2 provided with an upper section 2a, a lower section 2b and lateral sections 2c and 2d. A cross-shaped reinforcement rib is referred to as a whole with numeral 3.

The upper section 2a of frame 2 is substantially U-shaped in cross section. The same is true for the lateral sections 2c and for the area above the beads 4 for fastening the backrest. Reinforcement ribs 5 are provided within the U-shaped cross section to confer more stability. The lower section 2b of the frame 2 is substantially flat with reinforcement ribs 6 arranged on the front side thereof.

On the upper section 2a of the frame 2, a holding device 7 is formed for an adjusting motor of a head rest, wherein this adjusting motor is not illustrated in the drawings herein. Furthermore, holding devices 8, 9 are formed on the lateral sections 2c and 2d of the frame 2 and contribute to give the back rest its ergonomic shape by offering suitable anchor points for the padding that has to be fastened. Connecting ribs 10 serve as flow aids between the reinforcement rib 3 and the frame 2. Integrity and rigidity are at the same time improved by these connection ribs 10.

The reinforcement rib 3 consists of a central part 11 from which two connecting webs 12 lead to the upper corner areas of the frame 2, these being the places where the upper section 2a merges into the lateral sections 2c and 2d. Similarly, connecting webs 13 lead to the lower corner areas of the frame 2, these being the places where the lower section 2b merges into the lateral sections 2c and 2d. The reinforcement rib 3 extends thus substantially in the area of the diagonals of the rectangle formed by the frame 2.

A relatively large recess 14 is located between the connecting webs 13 and the lower section 2b, said recess receiving the gating for producing the supporting structure. The gating is referred to with numeral 15 in FIG. 3. The gating 15 communicates with the central part 11 and with the neighboring sections of the connecting webs 13 by way of the thin-walled gate. Once the casting has cooled down, the gate 16 can be removed by punching together with the gating 15. The recess 14 can also serve to receive component parts like a lordosis support for example, by means of which the curvature of the lumbar area of the back rest may be varied. The holding devices 7 and 8 are arranged in further recesses 17, 18 arranged between the connecting webs 12 and 13 on one hand and the sections 2a, 2c and 2d on the other. Easy deformation can thus be achieved without the need for additional measures.

A recess 19 dividing each connecting web 12 into two sections 12a and 12b is provided within either connecting web 12. This not only permits to save weight but also to above all optimize the manufacturing procedure. Particularly when the casting is formed by magnesium pressure die-casting, it is important to control the flow velocity of the material inside the mold. Fast flow is desired in order to keep cooling as small as possible. On the other side, foaming of the material has to be reduced as far as possible, which limits the increase of flow velocity. The subdivision of the connecting webs 12 into two sections 12a, 12b proved to permit an optimal casting process. Similarly, the connecting webs 13 are each divided into two sections 13a and 13b by means of recesses 20.

Figure 2:
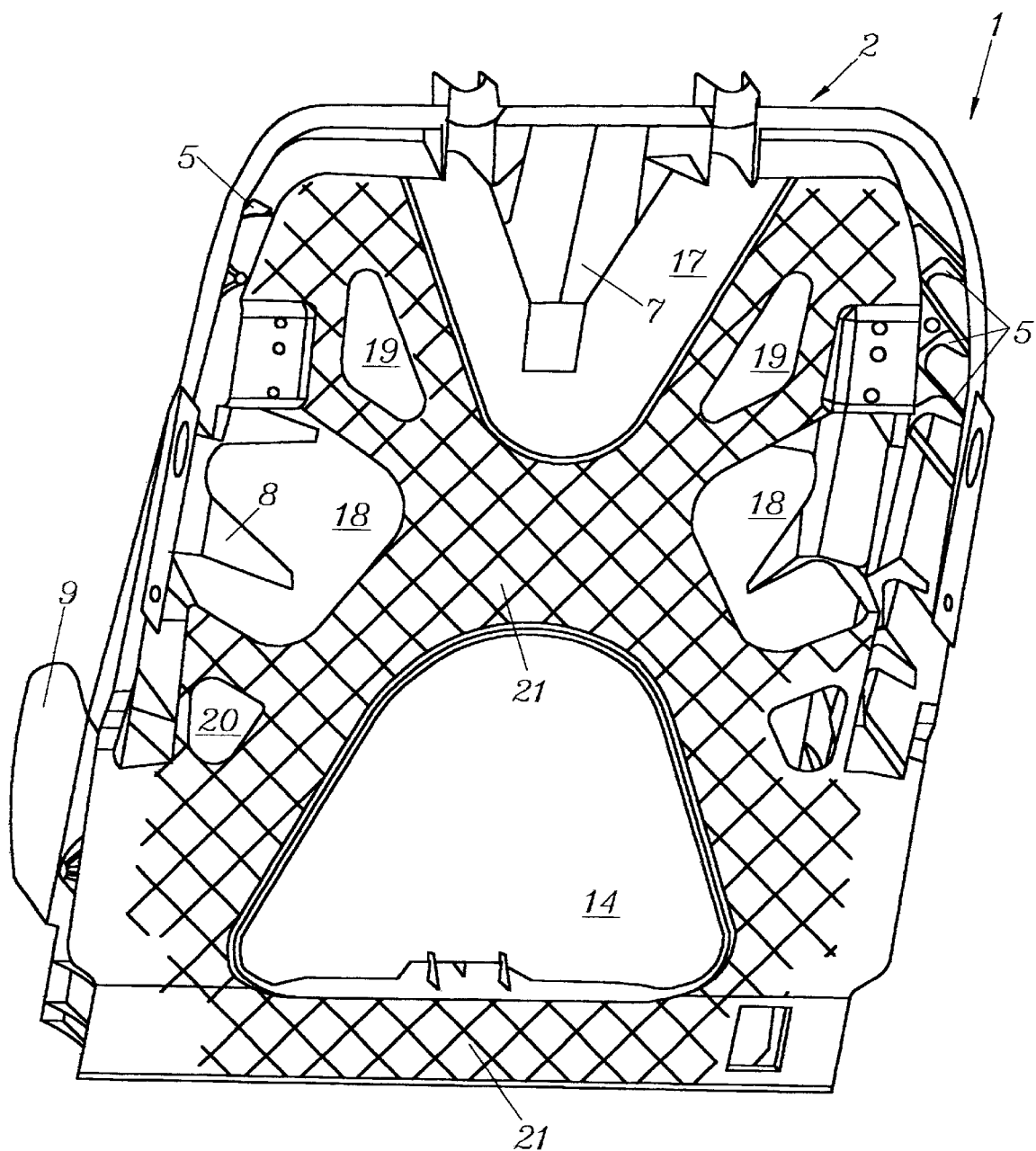
FIG. 2 is an axonometric rear view of the seat back of FIG. 1.
Figure 3:
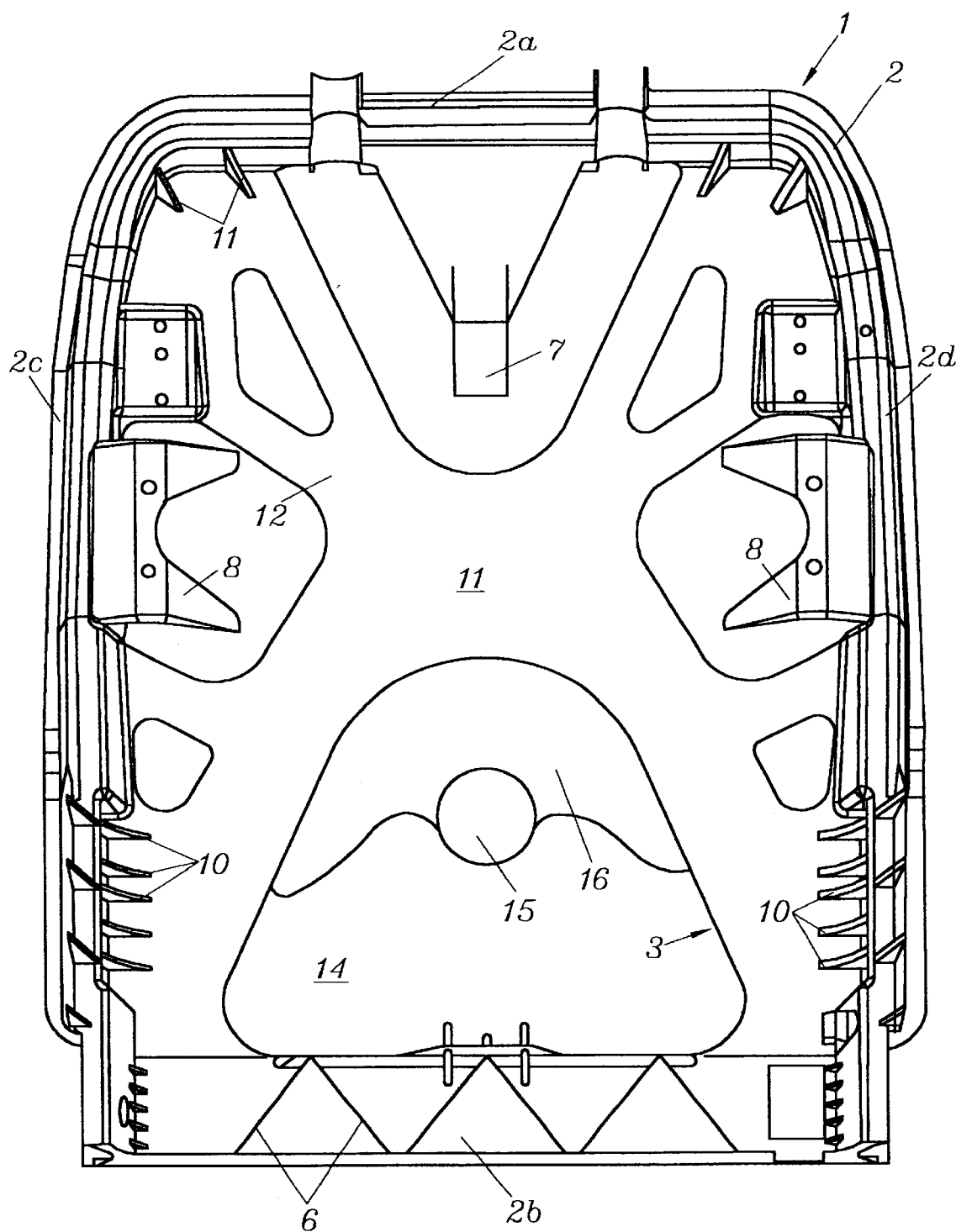
FIG. 3 is a front view of the seat back.
Figure 4:
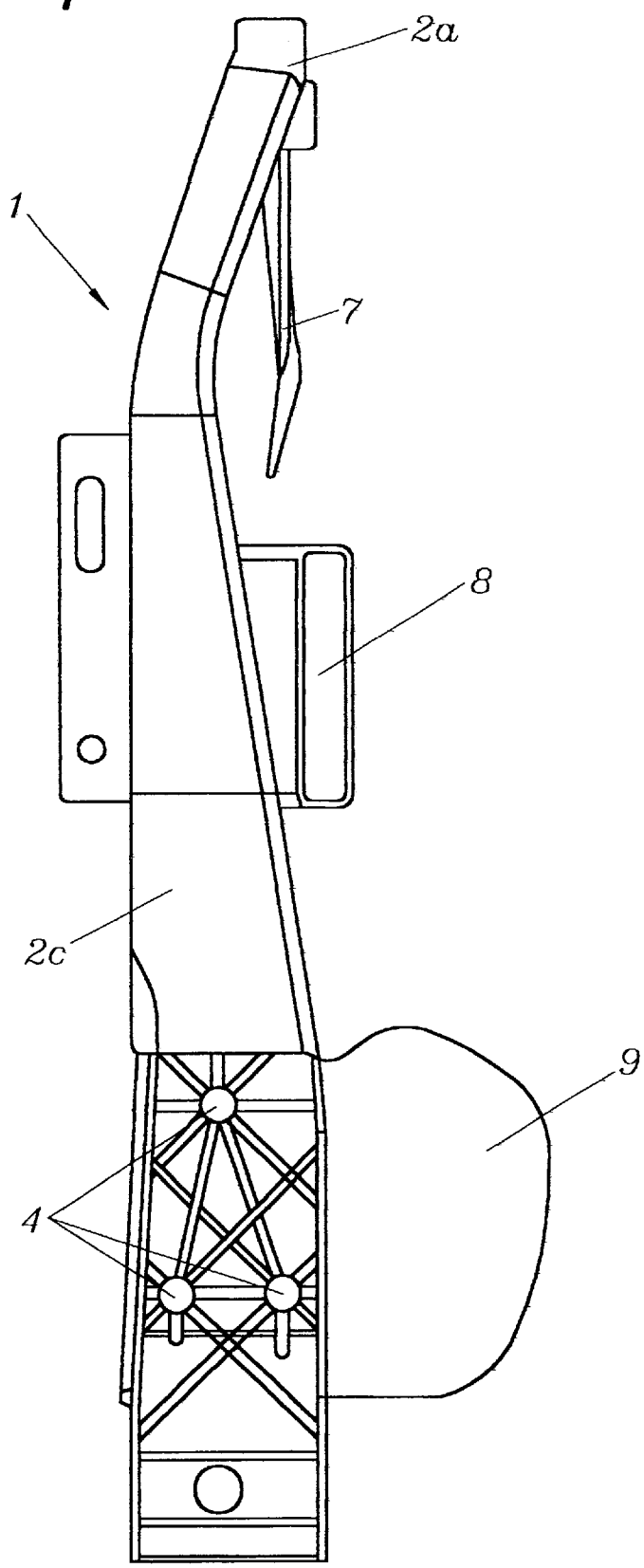
FIG. 4 is a side view of this seat back.

FIG. 2 shows rib structures 21 arranged in a grid-like configuration on the back side of the reinforcement rib 3 and in the lower section 2b of the frame 2.

The various connecting webs 12, 13 of the reinforcement rib 3 can be provided on their edges, i.e., in the area of the recesses 14, 17 or 18 or in the area of the recesses 19 and 20, with reinforcing border flanges that are not illustrated in the drawings herein.

Figure 5:
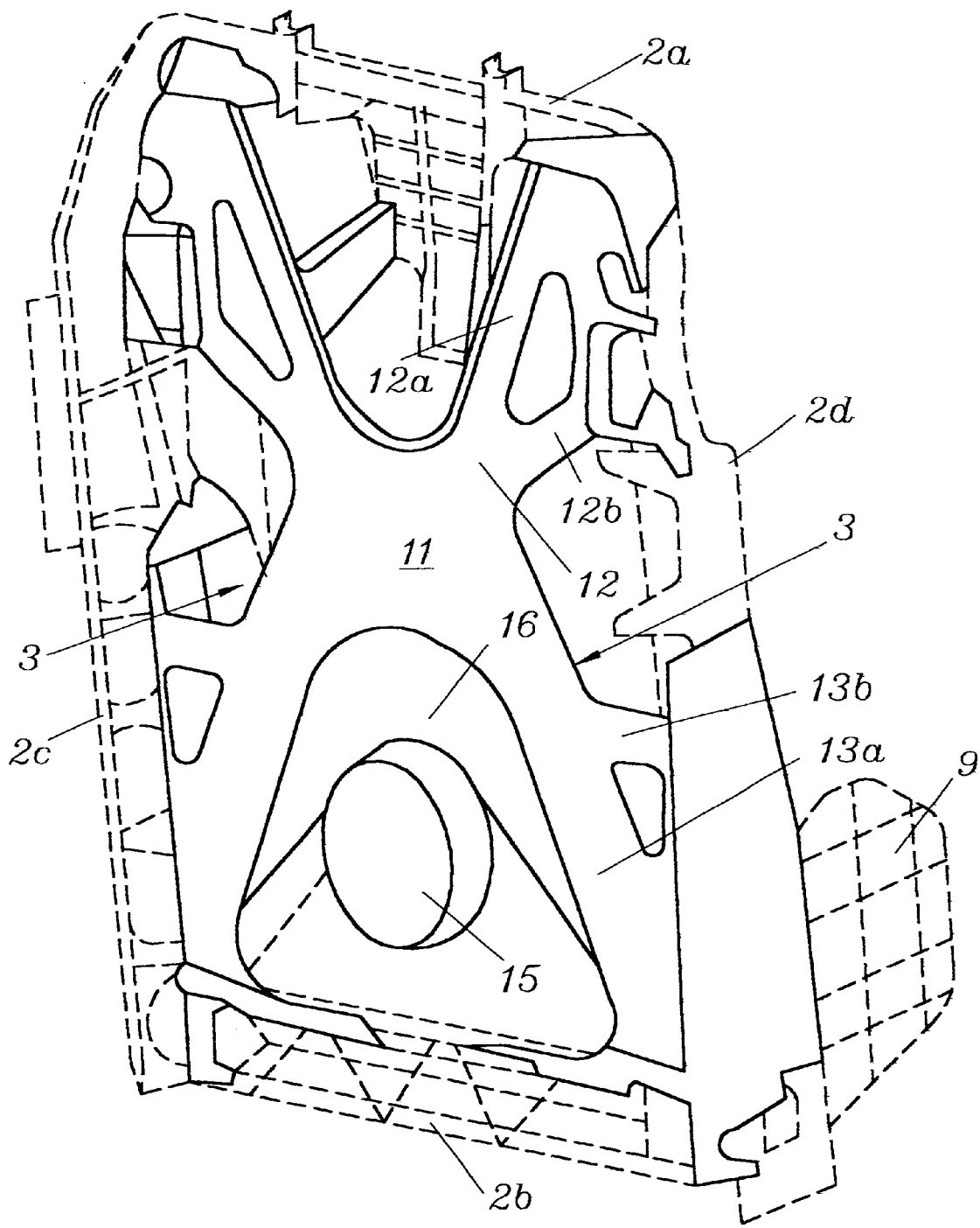
FIG. 5 is a diagram explaining the casting process utilized to produce a seat back according to the FIGS. 1 through 4.

FIG. 5 shows in a diagram how the filling of the mold takes place. In the simulation shown, it is assumed that the material fed amounts to approximately 50%. The parts of the work piece that are illustrated with continuous lines are those that have already been shaped by the material admitted, whereas the parts illustrated with dashed lines represent the cavities of the mold that have not yet been filled. It can be seen that in the illustrated state the reinforcement rib 3 is completely formed, whereas the frame 2 has only been realized as yet in the area of its corners. The advantage thereof is that the particularly critical parts, like the beads 4 for the anchor points and the area of the fastening for the belt, are formed soon so that the casting quality there is the best possible.

I claim:

1. Seat back for a vehicle with a one-piece supporting structure made of light metal alloy cast, with a frame, having an essentially rectangular contour and defining an upper, a lower and two lateral delimitations of the seat back, and a cross-shaped reinforcement rib provided with rib structures arranged thereon in a grid-like configuration, wherein the reinforcement rib is provided with a central part from which one connecting web projects to either corner of the frame, wherein at least one connecting web is divided into two sections by way of a recess.

2. Seat back for a vehicle with a one-piece supporting structure made of light metal alloy cast, with a frame having an essentially rectangular contour and defining an upper, a lower and two lateral delimitations of the seat back, and a cross-shaped reinforcement rib provided with rib structures arranged thereon in a grid-like configuration, wherein a gating for casting is accommodated in a recess constituted by the reinforcement rib and the frame.

3. Seat back for a vehicle with a one-piece supporting structure made of light metal alloy cast, with a frame having an essentially rectangular contour and defining an upper, a lower and two lateral delimitations of the seat back, and a cross-shaped reinforcement rib provided with rib structures arranged thereon in a grid-like configuration, wherein the reinforcement rib is provided with a central part from which one connecting web projects to either corner of the frame, wherein a gating for casting occurs in the central part of the reinforcement rib.

4. Seat back for a vehicle with a one-piece supporting structure made of light metal alloy cast, with a frame having an essentially rectangular contour and defining an upper, a lower and two lateral delimitations of the seat back, and a cross-shaped reinforcement rib provided with rib structures arranged thereon in a grid-like configuration, wherein connecting ribs are arranged on transitions between the frame and the reinforcement rib to serve as flow aids.

5. Seat back for a vehicle with a one-piece supporting structure made of light metal alloy cast, with a frame, having an essentially rectangular contour and defining an upper, a lower and two lateral delimitations of the seat back, and a cross-shaped reinforcement rib provided with rib structures arranged thereon in a grid-like configuration, wherein the reinforcement rib and the frame are a unitary part produced in one casting procedure.

* * * * *